United States Patent [19]

Ungchusri et al.

[11] Patent Number: 5,624,124
[45] Date of Patent: Apr. 29, 1997

[54] BORE SEAL ASSEMBLY WITH WEAR RING HAVING CURVILINEAR SPRING SUPPORT SURFACE

[75] Inventors: Tep Ungchusri, Woodlands; Sergio A. Castillo, Jr., Spring, both of Tex.

[73] Assignee: FMC Corporation, Chicago, Ill.

[21] Appl. No.: 680,093

[22] Filed: Jul. 15, 1996

[51] Int. Cl.$^6$ ........................................ F16J 15/12
[52] U.S. Cl. ................ 277/167.5; 277/198; 277/207 A; 285/336; 285/354
[58] Field of Search ................ 277/167.5, 171, 277/198, 207 A; 285/336, 354, 341, 363

[56] References Cited

U.S. PATENT DOCUMENTS

| | | | |
|---|---|---|---|
| 1,858,173 | 5/1932 | Smittle | 277/157 |
| 1,860,267 | 5/1932 | Smittle | 288/13 |
| 2,789,847 | 4/1957 | Jackson | 288/1 |
| 2,964,343 | 12/1960 | Klingler | 288/27 |
| 3,118,681 | 1/1964 | Fuehrer | 277/9 |
| 3,217,922 | 11/1965 | Glasgow | 220/46 |
| 3,390,889 | 7/1968 | Grover | 277/198 |
| 3,501,158 | 3/1970 | Tillman, III | 277/171 |
| 3,594,022 | 7/1971 | Woodson | 285/336 |
| 3,643,984 | 2/1972 | Bucceri | 285/94 |
| 3,749,426 | 7/1973 | Tillman, III | 285/336 |
| 3,918,725 | 11/1975 | Dryer | 277/167 |
| 3,990,712 | 11/1976 | Dechavanne | 277/165 |
| 4,214,763 | 7/1980 | Latham | 277/167 |
| 4,441,725 | 4/1984 | Bailey | 277/167 |
| 4,470,609 | 9/1984 | Poe | 277/170 |
| 4,471,965 | 9/1984 | Jennings et al. | 277/26 |
| 4,930,791 | 6/1990 | Ungchusri et al. | 277/151 |
| 5,149,148 | 9/1992 | Taeuber, Jr. et al. | 285/341 |

FOREIGN PATENT DOCUMENTS

| | | | |
|---|---|---|---|
| 241347 | 10/1987 | European Pat. Off. | 285/336 |
| 492923 | 3/1930 | Germany | 285/336 |
| 577291 | 5/1933 | Germany | 285/336 |
| 264774 | 5/1929 | Italy | 285/336 |
| 1316841 | 5/1973 | United Kingdom | F16J 9/20 |

*Primary Examiner*—Scott Cummings
*Attorney, Agent, or Firm*—Henry C. Query, Jr.

[57] ABSTRACT

A bore seal assembly for sealing between adjoining tubular members having a seal pocket formed in the adjacent ends thereof which comprises a cylindrical seal sleeve having a bore and two radially outwardly extending sealing lips for engaging the seal pocket, a cylindrical finger spring mounted within the bore of the seal sleeve and having an annular central section and a plurality of fingers extending axially outwardly therefrom for urging the sealing lips against the seal pocket, and a cylindrical wear sleeve having a curvilinear outer diameter for supporting the fingers and transferring the contact point between the fingers and the wear sleeve toward the ends of the fingers to thereby increase the stiffness of the fingers and maintain a spring force sufficient to overcome the force caused by contraction of the seal sleeve in low temperatures.

2 Claims, 3 Drawing Sheets

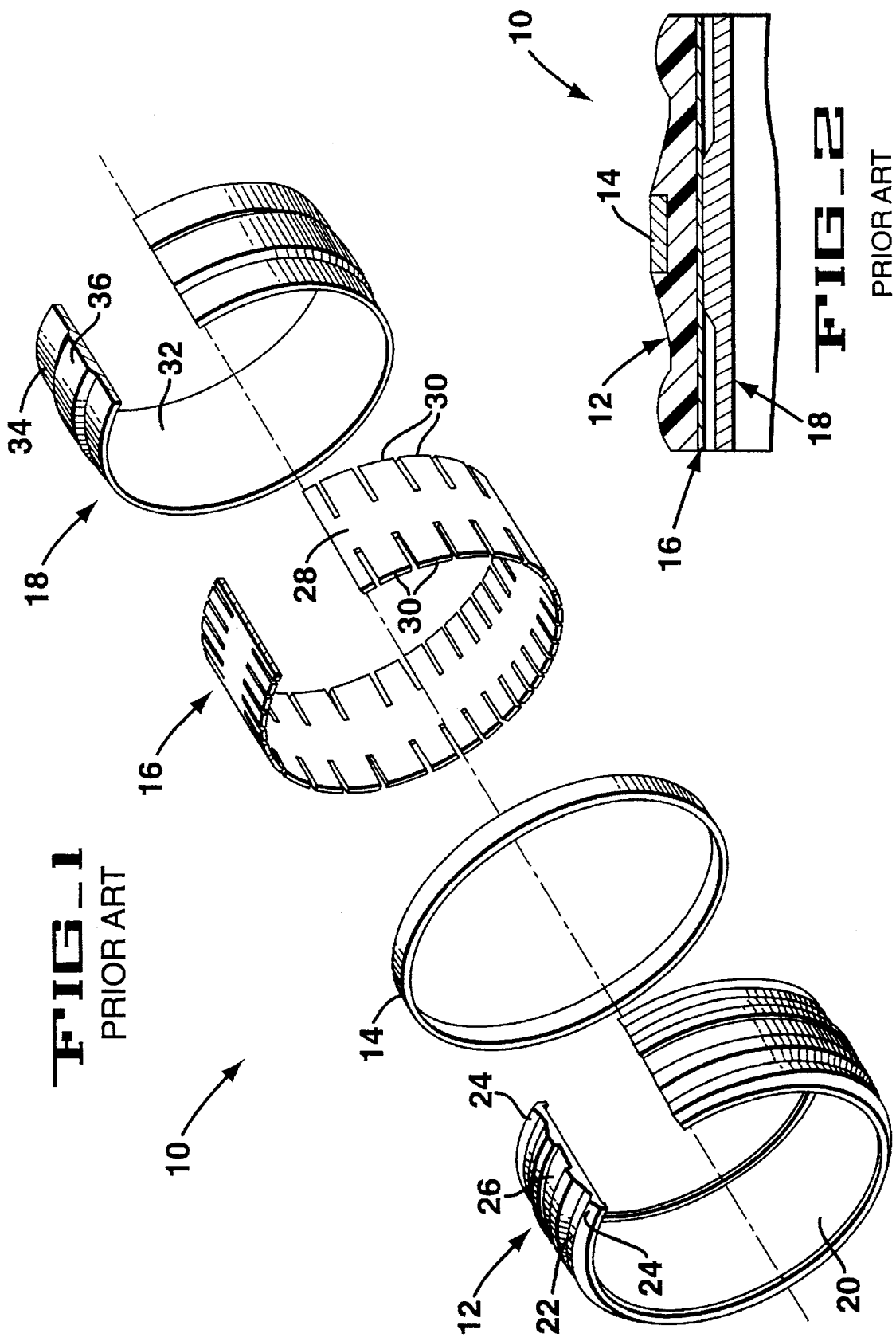

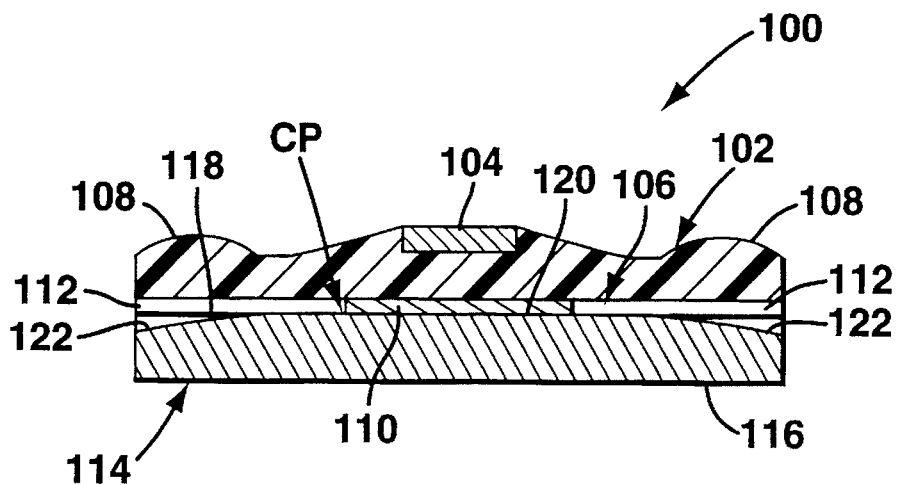
FIG_3A
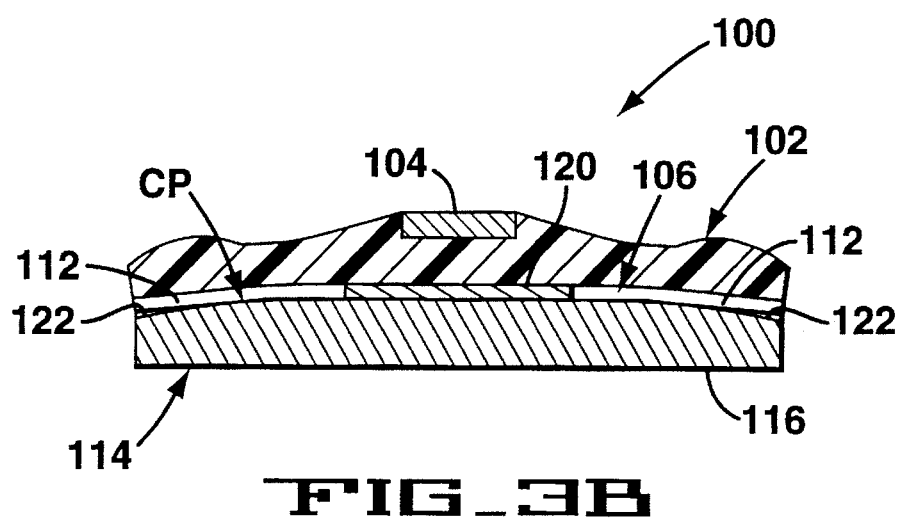
FIG_3B
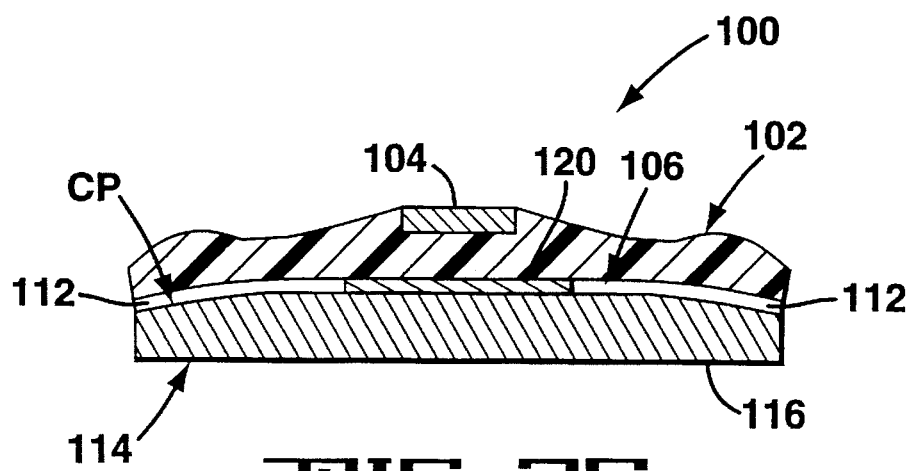
FIG_3C

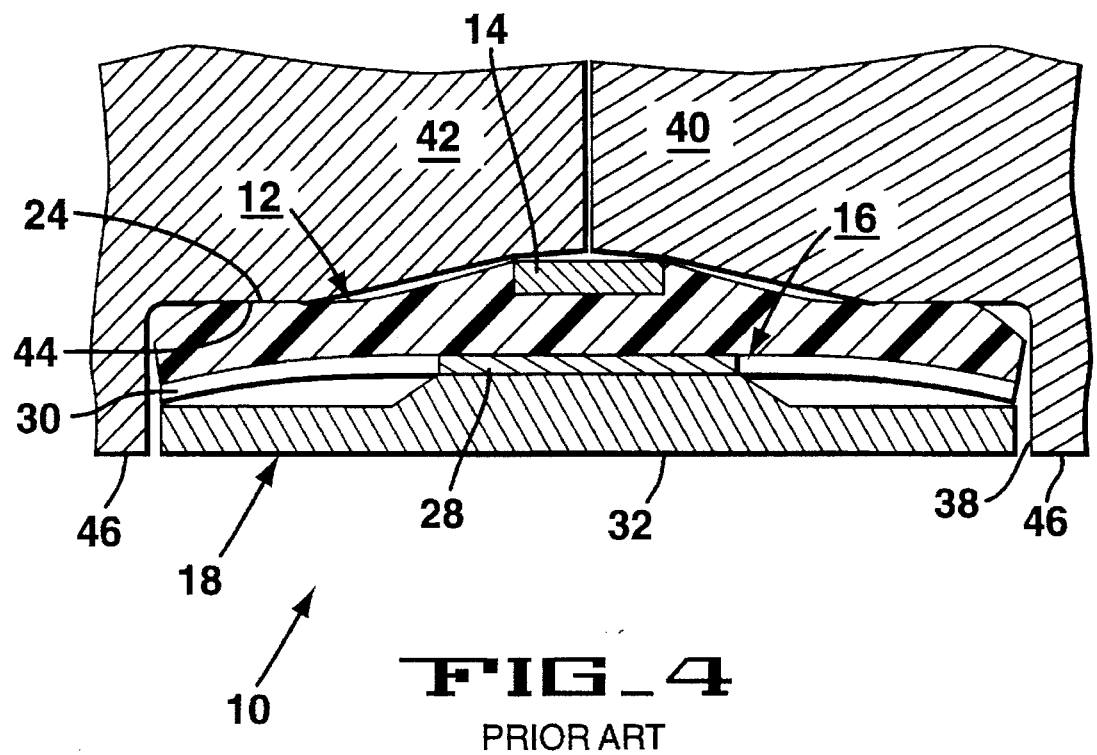
FIG_4
PRIOR ART
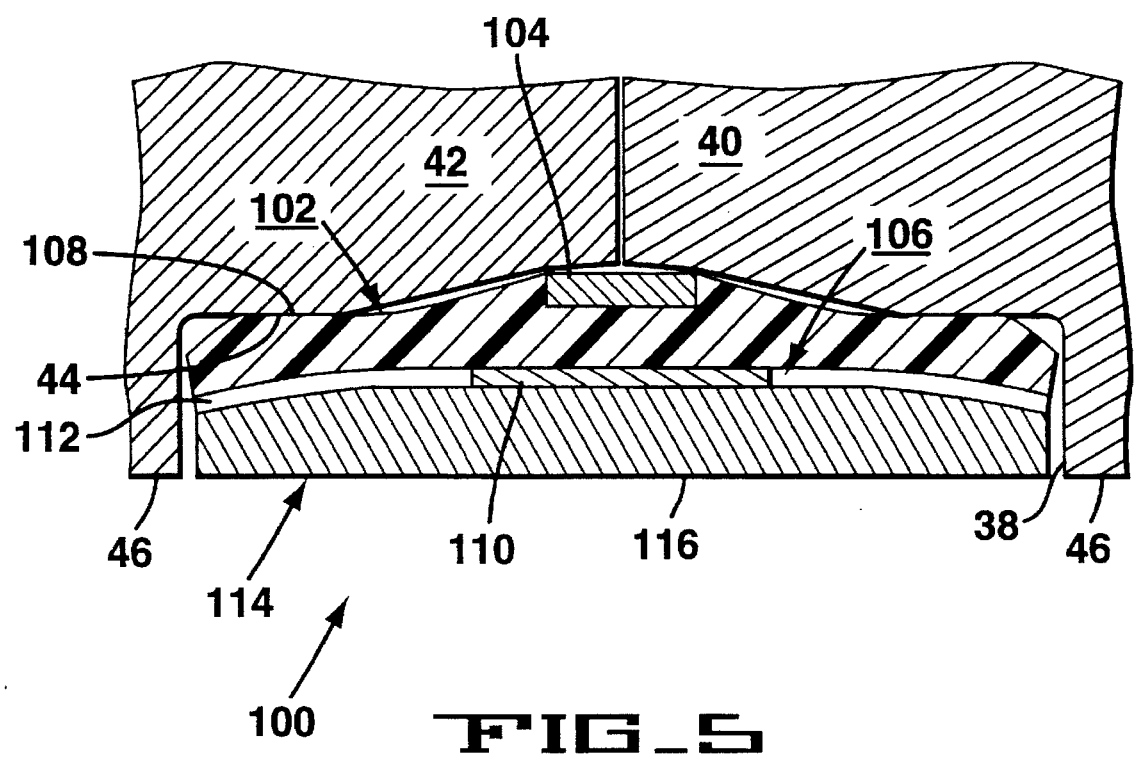
FIG_5

BORE SEAL ASSEMBLY WITH WEAR RING HAVING CURVILINEAR SPRING SUPPORT SURFACE

BACKGROUND OF THE INVENTION

1. Field of the Invention

The present invention relates to annular bore seals for use in pipe connectors and swivel joints, among other devices.

2. Description of Related Art

Bore seals are used to provide a fluid-tight seal between adjoining pipes or members of swivel joints. U.S. Pat. No. 4,930,791, which is owned by the assignee hereof, discloses a bore seal assembly mountable within a seal pocket formed in the adjacent ends of the pipes to be sealed. This bore seal assembly comprises a cylindrical seal sleeve having a pair of annular sealing lips for sealing against corresponding sealing surfaces formed in the seal pocket, a cylindrical finger spring mounted within the bore of the seal sleeve for urging the seal sleeve against the seal pocket, and a cylindrical wear sleeve mounted within the bore of the finger spring to protect the seal sleeve and finger spring against erosion and hold the entire bore seal assembly together. The finger spring comprises an annular central section and a plurality of fingers extending axially therefrom around the entire circumference of the finger spring. In addition, the wear sleeve includes an annular rib extending radially outwardly from the wear sleeve for engaging the central section of the finger spring. In this manner, the fingers of the finger spring are permitted to flex radially inwardly adjacent the central section as the bore seal assembly is installed and impart a preload force which urges the sealing lips against the sealing surface of the seal pocket.

In this prior art bore seal assembly, the seal sleeve is constructed of a non-metallic material, such as Teflon®, and the finger spring and wear sleeve are typically made of metal. When the bore seal assembly is exposed to very low temperatures, for example −100° F., it has been discovered that the seal sleeve will contract against the finger spring and the wear sleeve and cause the fingers to yield adjacent the central section. As a result, the fingers are unable to maintain the preload force between the sealing lips and the sealing surface and the seal will leak.

SUMMARY OF THE INVENTION

It is therefore an object of the invention to provide a bore seal assembly having a non-metallic seal sleeve which provides a high spring force and therefore results in a seal which does not leak at very low temperatures.

According to the present invention, this and other objects and advantages are achieved by providing a bore seal assembly for sealing between adjoining tubular members having a seal pocket formed in the adjacent ends thereof which comprises a cylindrical seal sleeve having a bore and two radially outwardly extending sealing lips for engaging the seal pocket, a cylindrical finger spring mounted within the bore of the seal sleeve and having an annular central section and a plurality of fingers extending axially outwardly therefrom for urging the sealing lips against the seal pocket, and a cylindrical wear sleeve having a curvilinear outer diameter for supporting the fingers and transferring the contact point between the fingers and the wear sleeve toward the ends of the fingers to thereby increase the stiffness of the fingers and maintain a spring force sufficient to overcome the force caused by the contraction of the seal sleeve in low temperatures. Therefore, the bore seal assembly is able to maintain a preload force sufficient to urge the seal lips against the seal pocket and prevent leaks even at low temperatures.

These and other objects and advantages of the present invention will be made apparent from the following detailed description, with reference to the accompanying drawings.

BRIEF DESCRIPTION OF THE DRAWINGS

FIG. 1 is an exploded perspective view of a prior art bore seal assembly;

FIG. 2 is a longitudinal section view of the bore seal assembly of FIG. 1 shown in the assembled state;

FIGS. 3A through 3C are longitudinal section views of the bore seal assembly of the present invention in the uninstalled, partially installed and fully installed states, respectively (the tubular members into which the bore seal assembly is installed being omitted for clarity); and FIG. 4 is a longitudinal section view of the bore seal assembly of the prior art bore seal assembly of FIG. 2 installed in the seal pocket formed by two adjoining tubular members.

FIG. 5 is a longitudinal sectional view of the bore seal assembly of FIG. 3 installed in the seal pocket formed by two adjoining tubular members.

DETAILED DESCRIPTION OF THE PREFERRED EMBODIMENTS

Referring to FIGS. 1 and 2, a prior art bore seal assembly 10 is shown to comprise a cylindrical seal sleeve 12, a non-extrusion ring 14, a generally cylindrical finger spring 16 and a cylindrical wear sleeve 18. Seal sleeve 12 includes a bore 20 and an outer diameter surface 22 comprising two radially extending annular sealing lips 24 and a annular groove 26. Seal sleeve 12 is typically constructed of a non-metallic material, such as Teflon®. Non-extrusion ring 14 is positioned in groove 26 and functions to prevent seal sleeve 12 from extruding into the gap between two tubular members (see FIG. 4) in high-pressure applications. Finger spring 16 comprises a solid annular central section 28 and a plurality of fingers 30 extending axially from central section 28 in both directions around the entire circumference of finger spring 16. Finger spring 16 is constructed of a metallic material, and fingers 30 possess spring-like properties which enable them to flex relative to central section 28. Finger spring 16 is positioned within bore 20 of seal sleeve 12 and has a width approximately the same as the width of seal sleeve 12 so that the free ends of fingers 30 will engage the portion of bore 20 beneath sealing lips 24. Wear sleeve 18 comprises a throughbore 32 and an outer diameter surface 34 having an annular rib 36 extending radially outwardly therefrom. As best seen in FIG. 2, wear sleeve 18 is positioned within finger spring 16 and rib 36 engages central section 28 of finger spring 16.

Referring to FIG. 4, bore seal assembly 10 is shown installed within a seal pocket 38 formed in the adjoining ends of two connected tubular members 40, 42. Tubular members 40, 42 could be members of a pipe connector or a swivel joint which are joined together in a known manner by suitable means (not shown). Seal pocket 38 preferably includes a sealing surface 44 formed in each member 40, 42 against which bore seal assembly 10 may seal. Bore seal assembly 10 is sized so that throughbore 32 of wear sleeve 18 is aligned with bores 46 in tubular members 40, 42. When installed, seal sleeve 12 is forced into seal pocket 38 against sealing surfaces 44 and against fingers 30, causing fingers 30 to bend adjacent rib 34 of wear sleeve 18 and create a preload force which urges sealing lips 24 into sealing surfaces 44 to effect the seal.

Referring to FIG. 3A, the bore seal assembly of the present invention, indicated generally at 100, shares several components of the prior art bore seal assembly 10. Bore seal assembly 100 includes a seal sleeve 102, a non-extrusion ring 104 and a finger spring 106 which are substantially the same as the similarly named components described with reference to bore seal assembly 10. Thus, seal sleeve 102 is preferably made of a non-metallic material, such as Teflon®, and includes a number of radially outwardly extending annular sealing lips 108. Also, finger spring 106 comprises a solid central section 110 and a plurality of fingers 112 extending axially therefrom. In one embodiment of a bore seal assembly 100 according to the present invention, finger spring 106 is stamped from strips of Inconel X-750 which are 0.015" thick and 0.75" wide, fingers 112 are 0.25" long and 0.125" wide, and the spacing between adjacent fingers 112 is 0.03".

According to the present invention, bore seal assembly 100 also comprises a wear sleeve 114 having a throughbore 116 and a curvilinear outer diameter surface 118. In a preferred embodiment, outer diameter surface 118 includes a relatively flat central portion 120 for engaging central section 110 of finger spring 106 and gently radiused side portions 122 sloping downwardly from central portion 120. In the uninstalled state of bore seal assembly 100 depicted in FIG. 3A (that is, before bore seal assembly is installed in seal pocket 38), fingers 112 contact wear sleeve 114 at a contact point CP adjacent central portion 120. In this state, the moment arm of fingers 112 is substantially the length of fingers 112 from contact point CP to the free ends of fingers 112. As bore seal assembly 100 is being installed, seal sleeve 102 is compressed within seal pocket 38 against finger spring 106. As depicted in FIG. 3B, this causes fingers 112 to bend over side portions 122 and the contact point CP to move toward the free ends of fingers 112, which consequently shortens the moment arm of fingers 112. In the fully installed state, depicted in FIGS. 3C and 5, the contact point CP has moved even further toward the free ends of fingers 112, resulting in a relatively shod moment arm for fingers 112 as compared to the moment arm of fingers 30 depicted in FIG. 4.

Referring to FIG. 5, bore seal assembly 100 is shown installed within seal pocket 38. Bore seal assembly 100 is sized so that throughbore 116 of wear sleeve 114 is aligned with bores 46 in tubular members 40, 42. When installed, seal sleeve 102 is forced into seal pocket 38 against sealing surfaces 44 and against fingers 112, which causes fingers 112 to bend as described above and create a preload force which urges sealing lips 108 into sealing surfaces 44 to effect the seal.

As the contact point between fingers 112 and wear sleeve 114 is transferred toward the ends of fingers 112, the stiffness of fingers 112 is increased. This results in fingers 112 having a spring force sufficient to overcome the force caused by the contraction of seal sleeve 102 in very low temperatures, for example around −100° F. Furthermore, the gently radiused side portions 122 prevent stress concentrations from developing in fingers 112, which reduces the possibility that fingers 112 will yield under the force of contraction of seal sleeve 102. Therefore, bore seal assembly 100 is able to maintain a preload force which is sufficient to urge seal lips 108 against seal pocket 38 and prevent leaks even at low temperatures.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A bore seal assembly for sealing between adjoining tubular members having a seal pocket formed in the adjacent ends thereof, the bore seal assembly comprising:

a cylindrical seal sleeve having a bore and two radially outwardly extending sealing lips for engaging the seal pocket;

a cylindrical finger spring mounted within the bore, the finger spring comprising an annular central section and a plurality of fingers extending axially outwardly therefrom for urging the sealing lips against the seal pocket; and a cylindrical wear sleeve positioned within the finger spring, the wear sleeve comprising a curvilinear outer diameter surface for supporting the fingers and transferring the contact point between the fingers and the wear sleeve toward the ends of the fingers as the bore seal assembly is installed in the seal pocket.

2. The bore seal assembly of claim 1, wherein the outer diameter surface comprises a generally flat central portion and radiused side portions extending downward from the central portion.

\* \* \* \* \*